United States Patent [19]

Simmons et al.

[11] 4,113,268
[45] Sep. 12, 1978

[54] EXTENDED TEMPERATURE RANGE VALVE SEAL

[75] Inventors: Kenneth C. Simmons, Plainfield, Conn.; Harry C. Champlin, Jr., Ashaway, R.I.; Carl F. Livorsi, Holbrook, Mass.; Joseph A. Wucik, Jr., Westerly, R.I.

[73] Assignee: Posi-Seal International, Inc., North Stonington, Conn.

[21] Appl. No.: 797,921

[22] Filed: May 18, 1977

Related U.S. Application Data

[63] Continuation-in-part of Ser. No. 777,644, Mar. 15, 1977, abandoned.

[51] Int. Cl.² ............................................. F16J 15/34
[52] U.S. Cl. ................................. 277/168; 277/235 R
[58] Field of Search ............... 277/235 R, 30, 31, 168, 277/169, 171, 172

[56] References Cited

U.S. PATENT DOCUMENTS

| | | | |
|---|---|---|---|
| 3,140,097 | 7/1964 | Luertzing | 277/168 |
| 3,334,927 | 8/1967 | Faccou | 277/30 |
| 3,545,774 | 12/1970 | Rickley | 277/235 R |
| 3,645,546 | 2/1972 | Kaufman | 277/30 |
| 3,656,414 | 4/1972 | Müller | 277/168 |
| 3,909,017 | 9/1975 | Engström | 277/168 |
| 3,947,046 | 3/1976 | Maruyama | 277/235 |

*Primary Examiner*—Robert I. Smith
*Attorney, Agent, or Firm*—Kenyon & Kenyon, Reilly, Carr & Chapin

[57] ABSTRACT

A valve seal mechanism for use in pressurized fluid systems subject to fire risk, the seal having a soft seat to provide essentially zero leakage at normal operating temperatures and a backup hard metal seating surface capable of holding leakage to extremely low rates in the event of temperatures high enough to destroy the soft seat material. The seal mechanism is in the form of a hard metal seal ring adapted to fit within an undercut circumferential groove in a valve seat. The metal seal ring has a central inner circumferential rib adapted to extend through the groove opening for mating engagement with a sealing surface on the circumference of a valve disc. The rib of the metal seal ring itself has a circumferential undercut groove into which is tightly fitted a seal ring of material softer than the metal of the seal ring, the soft seal ring protruding beyond the adjacent inner surface of the rib to provide a primary valve seat surface. If the soft seal ring is destroyed by temperatures exceeding the normal operating range, the rib face provides an undamaged secondary valve seat surface.

7 Claims, 9 Drawing Figures

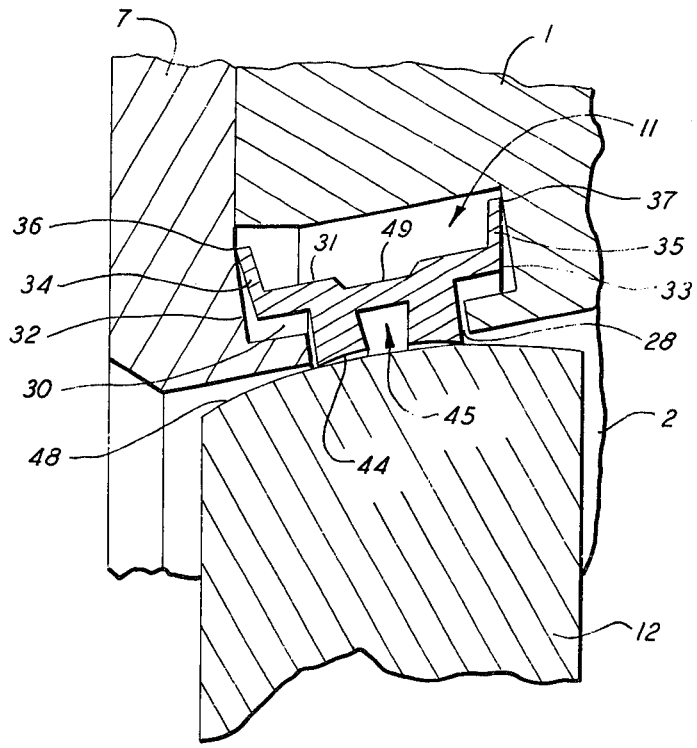
FIG. 4
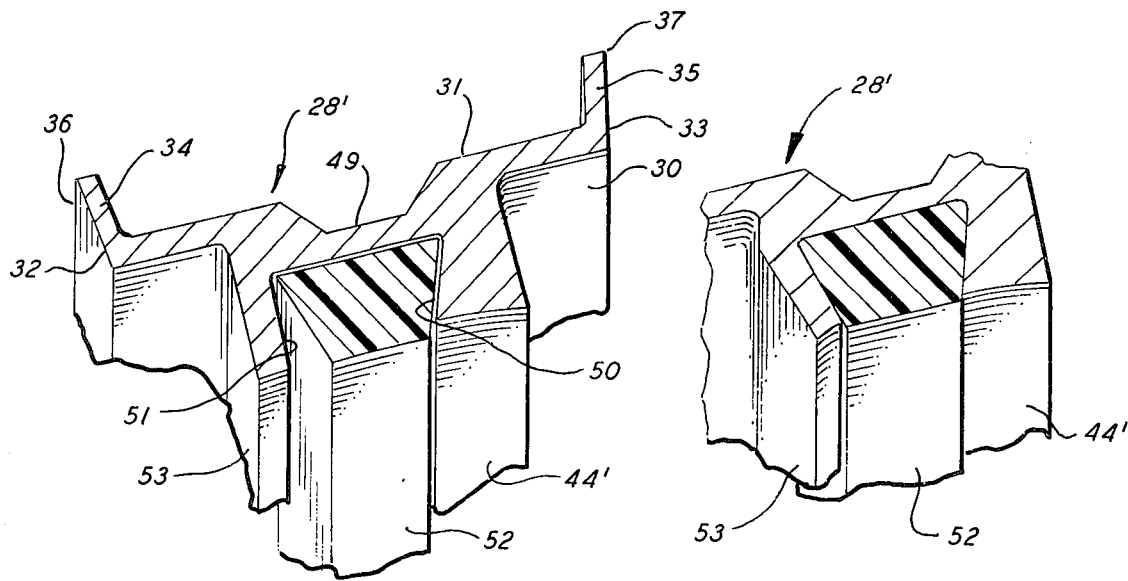
FIG. 5
FIG. 5A

EXTENDED TEMPERATURE RANGE VALVE SEAL

CROSS-REFERENCE TO RELATED APPLICATION

This is a continuation-in-part of application Ser. No. 777,644, filed on Mar. 15, 1977 and now abandoned.

BACKGROUND OF THE INVENTION

1. Field of the Invention.

The present invention relates to sealing mechanisms and more particularly to seal rings adapted to serve as seat rings in a valve.

2. Description of the Prior Art.

In U.S. Pat. No. 3,642,248, issued to Robert E. Benware and owned by the assignee of the present invention, there is disclosed a valve sealing mechanism in the form of a shouldered wear ring confined in an undercut circumferential groove. The wear ring has a coninutous central rib extending radially beyond the shouldered portion through the opening in the groove, the circumferential surface of the rib serving as a seating surface in mating contact with a complementary valve member sealing surface.

The wear ring in the Benware patent preferably is combined with an elastomeric O-type backing ring positioned between the bottom of the groove and the shouldered portion of the wear ring. The backing ring serves the dual function of urging the wear ring out of the groove into firm contact with the sealing surface and of sealing against leakage of fluid under pressure behind the wear ring.

An important application of butterfly valves of the general type described in U.S. Pat. No. 3,642,248 is in systems handling fluids at high pressure and temperature or flammable fluids that present a substantial risk of fire and resultant high temperatures. The patent recommends for such applications that the wear ring be fabricated of fully work hardened stainless steel and have a pair of outwardlly flared side flanges extending one from each side of the shouldered portion in a generally radial direction opposite to the central rib (column 10, line 30 through column 11, line 32).

The flare of the side flanges is designed to provide a preloaded lateral sealing force against the sidewalls of the groove. The inner circumference of the wear ring seating surface is designed to provide a preloaded radial sealing force between the wear ring seating surface and the sealing surface of the valve member. By thus laterally and radially preloading the stainless steel wear ring, positive sealing is provided both at the seating surface-sealing surface interface and at the lines of contact between the side flanges and the walls of the groove, even if excessive temperatures should damage or destroy the elastomeric backing ring.

Although the stainless steel wear ring is an effective "fire-safe" seal, the hard metal-to-metal contact yields a leakage rate higher than that experienced with wear rings fabricated from various plastic materials.

A subsequent patent (U.S. Pat. No. 3,986,699 issued to Joseph A. Wucik, Jr., et al. and also assigned to the assignee of the present invention) describes a "fire-safe" seal having a soft nonmetallic seal ring of the Benware type arranged in an undercut groove of revised design. The downstream lip of the groove in the Wucik et al. U.S. Pat. No. 3,986,699 is in the form of an annular thin-walled skirt having an inner circumference adapted to make preloaded sealing contact with a mating sealing surface of the valve member.

Thus, the improved arrangement of the Wucik et al. '699 patent provided a soft seating ring, for superior sealing under ordinary temperature conditions. The soft seating ring was then backed up by a hard metal-to-metal seal between the skirt-like lip and the sealing surface of the valve member.

Although the Wucik et al. "fire-safe" seal design is effective for its intended purpose, it has several practical drawbacks. First of all, it can be used only for installations where pressure is exerted always from the same direction, since the backup skirt seal must be downstream of the soft nonmetallic seal ring.

Secondly, the sealing lip, as disclosed, forms one side of the groove in a seating region of a valve, such as a butterfly trunnion valve. The dimensional tolerances of the lip are much closer than are needed for the rest of the groove elements, and concentricity of the lip with the valve member is important. Consequently, more than usual care and expense is involved in machining and assembling valves having this type of dual seal.

Increasingly stringent environmental requirements, placed particularly upon petroleum drilling and processing facilities, have resulted in a need for valves having the capability to withstand very high temperatures that may result from a fire, for example, and still provide very high sealing effectiveness after such a fire. The dual type of soft seal and hard metal backup seal have not proved able to meet such stringent requirements when installed in a wafer trunnion valve. In fact, it has been considered in the industry that only ball valves would be capable of providing the required "fire-safe" operation.

For example, the Oil Companies Materials Association (OCMA) has issued test specifications (OCMA Specification No. FSV-1: Fire Safe Test For Soft Seat Ball Valves) for a ball valve having a soft seat (e.g., a nonmetallic plastic or soft metal seat) for a high degree of sealing effectiveness under normal conditions. After exposure to test temperatures that completely destroy the soft seat, the valve must subsequently have a leakage rate at full rated pressure of no more than 10 milliliters per minute per inch of valve diameter. In no case shall the leakage rate after destruction of the soft seal be greater than 100 milliliters per minute.

Another well-known oil industry specification of similar stringency is EXXON BP 3-14-1. Up to the present time no standard production-line ball valve has been able to meet either of these specifications, and wafer trunnion valves have performed even less well..

SUMMARY OF THE INVENTION

It is an object of the present invention to provide an improved seal ring for use as a seat ring for valves in extended-temperature range service.

Another object of the invention is to provide a metal seal ring adapted for "fire-safe" service and having improved sealing characteristics under normal operation conditions.

Another object of the invention is to provide an extended-temperature range seal ring adapted for retrofit into conventional valves already installed in field service.

It is a further and important object of the invention to provide a "soft seat" type of seal ring that is adapted for use in butterfly trunnion valves that will meet or exceed the requirements of the Oil Companies Materials Association Specification No. FSV-1 and EXXON BP 3-14-1 for fire safe service.

The foregoing and other objectives are achieved by the improved seal ring of the present invention. This ring is of the type having a hard metal body formed with a cylindrical shoulder portion, the shoulder portion being defined by a circumferential front surface, an opposed circumferential rear surface, and two ends. A pair of circumferential flanges extend from the rear surface of the shoulder portion at each of the respective ends, each flange having a circumferential edge spaced radially from the rear surface of the shoulder portion. A circumferential rib extends from the front face of the shoulder portion intermediate the ends, and terminates in a circumferential seating surface, the width of the rib being less than the distance between said ends of the shoulder portion.

The seal ring is adapted to fit within an undercut circumferential groove in a seating region of a valve, such groove having substantially parallel sides spaced apart by a distance greater than the distance between the ends of the shoulder portion of the ring and an opening narrower than the distance between the sides of such groove. The rib of the seal ring is adapted to extend through such a groove opening for slidable interference engagement of the rib seating surface with a complementary sealing surface of such a valve.

The improvement of the present invention comprises a circumferential groove formed in the seating surface of said rib, the groove having an opening narrower than the width of an interior portion thereof, and a seat ring of material softer than the hard metal of the seal ring, the seat ring fitting tightly against the sides and bottom of the groove in the rib and extending through the opening of the rib groove beyond the rib seating surface to provide a primary valve seat surface, said primary valve seat surface of said seat ring being adapted to provide the only sealing engagement with such complementary valve sealing surface unless the temperature inside such valve exceeds the destruction temperature of the seat ring material.

The material of the seal ring is preferably work-hardened stainless steel, while the soft seal ring inserted in the rib groove is preferably a resilient nonmetallic material such as polytetrafluoroethylene. For certain applications, the seat ring may be a soft metal, however, such as lead or copper.

In one preferred embodiment of the invention, the rib groove of the seal ring has a dovetail cross section, and the seat ring has a complementary solid trapezoidal cross section. An alternate embodiment of the seat ring has a V-shaped cross-section, thereby permitting the seat ring to be inserted in the dovetail groove by compressing the arms of the V-section together. In a third preferred embodiment, the rib groove and the seat ring both have T-shaped cross sections. This embodiment provides increased resistance against blow-out of the seat ring from the groove when the valve is opened under very high pressure conditions.

To permit use of a seat ring having a solid cross section, the invention also includes a method of fabricating the seal ring which comprises forming a groove wider than necessary in the face of a rib of a shouldered metal seal ring, the remaining portions of the rib forming two side walls of the groove with at least one of the side walls being undercut in relation to the opening of the groove; inserting a relatively soft seat ring into the groove, the seat ring having one side wall that conforms to the one side wall of the groove, a rear surface that conforms to the bottom of the groove, and a front surface which is narrower than the opening to the groove; and plastically displacing the other side wall of the groove into close-fitting contact with the other side of the seat ring to provide a fluid-tight seal between the seat ring and the side walls of the groove.

The foregoing and other objects, features and advantages will become more apparent from the following detailed description of the preferred embodiments and the accompanying drawings.

BRIEF DESCRIPTION OF THE DRAWINGS

FIG. 4 is a partial section view similar to FIG. 3, but showing the seal ring after destruction of the soft seat ring insert and the backing ring.

FIG. 5 is a partial perspective view in section of an alternate embodiment of the seal ring at an intermediate stage of assembly.

FIG. 5a is a partial perspective view in section, similar to FIG. 5, showing the completed seal ring assembly.

DESCRIPTION OF THE PREFERRED EMBODIMENTS

Figure 1:
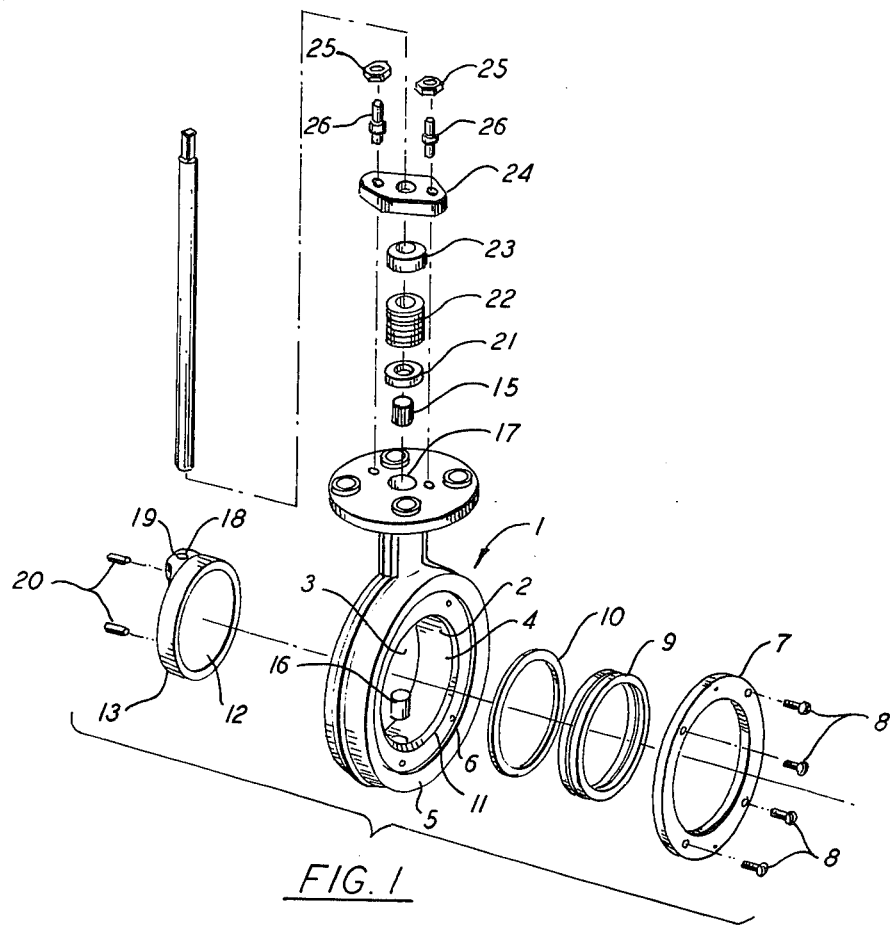
FIG. 1 is an exploded perspective view of a conventional butterfly trunnion valve suitable for incorporating the improved seal mechanism of the present invention.

To aid in understanding the arrangement and operating principle of the improved seal ring of the present invention, it will be described in embodiments incorporated in an otherwise conventional butterfly valve or trunnion valve. FIG. 1 shows such a valve in exploded perspective.

The trunnion valve in FIG. 1 includes a valve body 1 in the form of a flat annular wafer having an internal passageway 2 with an inlet 3 and an outlet 4. The downstream or outlet face 5 of the valve body is counterbored with an annular recess 6 for flush mounting a retainer ring 7 by means of flat head machine screws 8. Retainer ring 7 serves to hold a sealing ring or wear ring 9 and a backing ring 10 within a circumferential groove 11 machined in the downstream edge of passageway 2.

A valve disc 12 having a circumferential sealing surface 13 is adapted to be mounted within passageway 2 for rotation about a diametral axis between an open position in which the valve disc is substantially parallel to the axis of passageway 2, and a shut position, in which the valve disc is substantially perpendicular to the passageway axis, and sealing surface 13 makes mating contact with the valve seat structure that includes wear ring 9 and retainer ring 7.

Means for pivotally mounting the valve disc in the passageway for rotation between the open and shut positions includes a valve stem 14, mounted in upper and lower bushings 15 and 16 for rotation within a hole 17 bored diametrally through the valve body. Valve stem 14 passes through a hole 18 drilled through a diametral boss 19 on the upstream face of the valve disc. The disc is locked to the stem by pins 20.

Leakage past the upper end of valve stem 14 is prevented by conventional stem packing means including spacer 21 and resilient packing rings 22, which are compressed in hole 17 against the top of bushing 15 by forcing gland 23 and follower 24 downward by means of nuts 25 screwed down on studs 26. Valve stem 14 is rotated in its bushings by a handle or motor drive (not shown) attached to the squared upper end 27 of the stem.

The structure, operation, and method of constructing the improved seal ring of the present invention are shown in FIGS. 2 - 7 and are described below.

Figure 2:
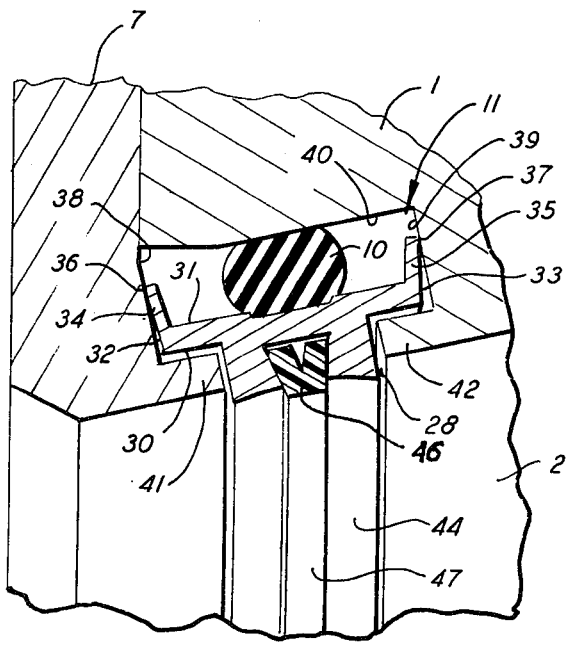
FIG. 2 is a partial cross section of a preferred embodiment of the seal ring in combination with a conventional backing ring in the valve of FIG. 1, with the valve disc open.

FIG. 2 shows a section of the assembled seating arrangement of the valve in FIG. 1, but incorporating one embodiment of an extended-temperature range seal ring 28 of the present invention. The basic form of the shouldered hard metal seal ring 28 and the arrangement of the seal ring and backing ring 10 within groove 11, are as described in the previously mentioned Benware U.S. Pat. No. 3,642,248. (See particularly FIGS. 14 and 15 of the '248 patent). There are several important differences in detail and function, however.

Seal ring 28 is formed with a cylindrical shoulder portion 29 defined by a circumferential front surface 30, an opposed rear surface 31, and ends 32, 33. A pair of flanges 34 and 35 extend from the rear surface of the seal ring at the respective ends 32 and 33. Flange 34 terminates in a circumferential edge 36 spaced radially rearward from rear surface 31, and flange 35 terminates similarly in a circumferential edge 37.

Groove 11, in which the seal ring is positioned, has side walls 38, 39 and base or rear wall 40. The distance between side walls 38 and 39 is slightly greater than the distance between ends 32 and 33 of the shouldered portion of ring 28. Flanges 34 and 35 flare outward, however, so that circumferential edges 36 and 37 engage the side walls of groove 11 with an interference fit.

The distance between side walls 38 and 39 is also greater than the width of the opening of the groove, the opening being formed between lips 41 and 42 which extend from the respective side walls of the groove. A rib 43 extends from the front face of the shoulder portion of ring 28 and terminates in a circumferential seating surface 44. The width of the rib is less than the distance between the ends of the shoulder portion, such that a clearance is formed between the sides of the rib and the groove opening.

A circumferential groove 45 (see FIG. 4) is formed in the seating surface of the rib 43, the groove having an opening narrower than the width of the groove at its base. Specifically, the cross section of the groove has a dovetail shape. Within groove 45 is inserted a seat ring 46. Seat ring 46 is made of a material softer than the metal of the seal ring, such material preferably being a resilient nonmetallic material such as polytetrafluoroethylene. The seat ring fits tightly within groove 45, the sides and base of the seat ring conforming closely to the sides and base of the groove. The radial dimension of the seat ring is greater than the depth of the groove so that the ring extends beyond the seating surface of rib 43 and terminates in a primary valve seat surface 47.

Figure 3:
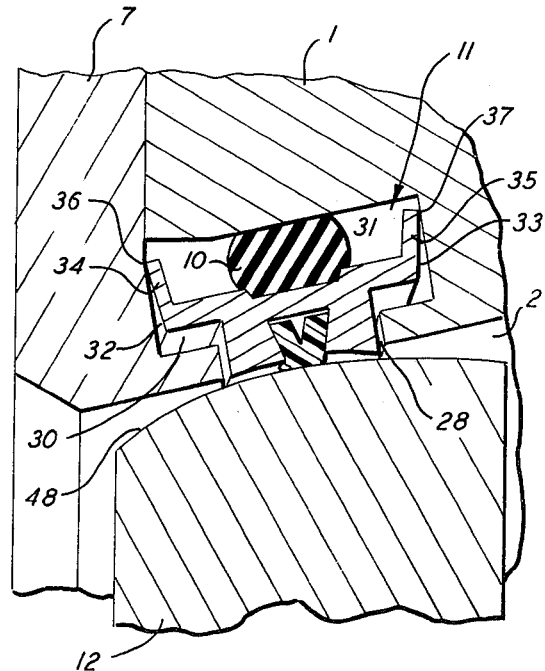
FIG. 3 is a partial section view similar to FIG. 2, but with the valve disc closed.

With reference next to FIG. 3 the seal ring arrangement is shown with the valve disc 12 in the closed position. It will be noted from a comparison of FIG. 3 with FIG. 2 that sealing surface 48 of valve disc 12 engages primary valve seat surface 47 of the seat ring with an interference fit sufficient to move the seal ring rearward towards the base of groove 11. This interference fit provides a radial preload such that substantially perfect sealing is obtained between the soft seat ring 46 and sealing surface 48. At the same time, backup ring 10 provides an equally good seal between the base of groove 11 and the rear surface of the shoulder portion of the seal ring. The function of backup ring 10 is this regard is the same as the function of the backup ring disclosed in the previously mentioned Benware patent.

Turning next to FIG. 4, the sealing arrangement is shown after the soft seat ring 46 and backup ring 10 have been completely destroyed by excessively high temperatures. It will be noted that now sealing engagement with sealing surface 48 on the valve disc is made by seating surface 44 of the metal seal ring. In particular, it should be noted that the seating surface 44 has a smaller cross-radius of curvature than that of the sealing surface 48 on the valve disc. Thus contact is made only by the two outside edges of seating surface 44. This small area of contact results in high contact pressures and excellent sealing. At the same time, the bypass path around the rear of the seal ring is closed by the preloaded circumferential edges 36 and 37 bearing against the side walls of groove 11.

In order to be able to insert nonmetallic seat ring 46 into dovetail groove 45, the seat ring shown in FIGS. 2 and 3 has a V-shaped cross section. This V shape permits the seat ring to be compressed together to allow insertion through the narrow opening of the groove. The resilience of the seat ring material then expands the sides of the V into close contact with the sides of the groove.

Referring again to FIG. 4, it will be noted that there is a shallow groove or channel 49 formed in the rear surface 31 of the shoulder portion of ring 28. This channel helps to center backup ring 10 in groove 11, but its more important function is to produce a predetermined thickness of metal between the base of groove 45 and the bottom of channel 49 such that a desired springiness is achieved in preloading the flanges of the ring against the side walls of groove 11. In the prior embodiment of the metal seal ring shown in U.S. Pat. No. 3,642,248, such springiness was achieved by making the cross section of the metal ring substantially uniform. That is to say, the rear surface of the ring was extended up into the rib portion. In the improved ring design of the present invention, the rib must be solid in order to provide room for forming groove 45.

In FIGS. 5 - 5a an alternate embodiment of the seal ring is shown which uses a seat ring having a solid trapezoidal cross section. This provides a stronger seat ring cross section. In order to permit insertion of this type of seat ring into the groove, the present invention provides a method of assembly illustrated by these figures. As shown in FIG. 5 the groove in the seating surface 44 of seal ring 28' has only one undercut side wall 50. The other side wall 51 is formed at right angles with the base of the groove. This provides an opening to the groove large enough to permit insertion of seat ring 52. After insertion of the seat ring, wall 53 of the rib is bent or crimped against the corresponding side of seat ring 52 as shown in FIG. 5a. This method of construction and assembly provides a fluid-tight union between the soft seat ring 52 and the metal ring 28'. It also permits insertion of the seat ring without special tools, thereby providing a low cost method of assembling the completed seal ring.

The V-shaped and solid trapezoidal cross sections of the seat rings provide two advantages. First, this shape locks the seat ring into the groove. Secondly, it provides a self-acting sealing effect. Any fluid that may leak around to the rear of the seat ring from the high pressure side, when the valve disc is shut, will exert an outward force on the base of the trapezoidal section. This force urges the downstream side of the seat ring into closer sealing engagement with the contiguous wall of the rib. It also amplifies the sealing pressure between the face of the seat ring and the sealing surface of the valve disc by the ratio of the back and front areas of the seat ring.

Figures 6, 6A:
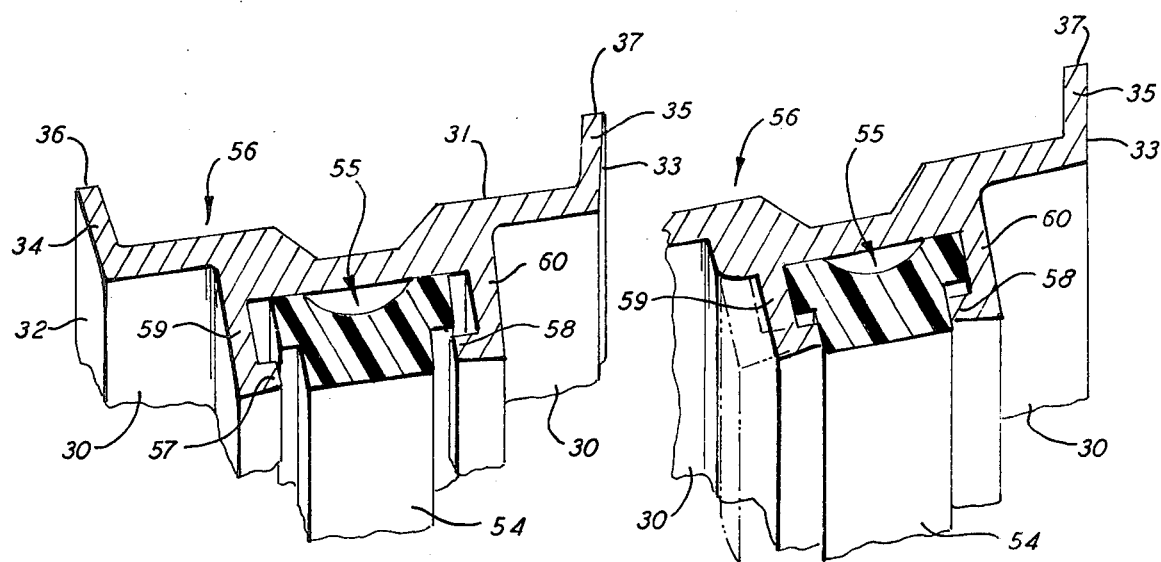
FIG. 6 is a partial perspective view in section of another alternate embodiment of the seal ring at an intermediate stage of assembly.
FIG. 6a is a partial perspective view in section, similar to FIG. 6, showing the completed seal ring assembly.

With reference next to FIGS. 6 and 6A, still another embodiment of the invention has a seat ring 54 with a T-shaped cross section, which fits in a mating T-shaped groove 55 in the rib of a metal seal ring 56. The design of seal ring 56 is essentially the same as those of the previously described embodiments, except in the shape of the rib groove. Consequently, elements of seal ring 56 that are unchanged from similar elements of the preceding embodiments are identified with the same numerals and will not be described again.

The principal difference between the seal ring of FIGS. 6 and 6A and the previously described seal rings is in the shape of the groove and the manner of installing the seat ring in the rib groove. As shown in FIG. 6, undercut groove 55 is initially formed in the rib with the spacing between lips 57 and 58 at the mouth of the groove being sufficient to allow insertion of the shouldered portion of seat ring 54 into the groove.

After the seat ring has been snapped into the groove, as shown in FIG. 6, one side wall 59 of the groove is plastically displaced laterally from the dotted line position to the solid line position in FIG. 6A. This step can be accomplished by rolling the side wall, while seal ring 56 is held in a lathe, until the seat ring fits snugly against side wall 60, and there is no gap between the rib portion of seat ring 54 and the edges of lips 57 and 58. The result is a close seal between the hard metal seal ring and the softer seat ring.

Figure 7:
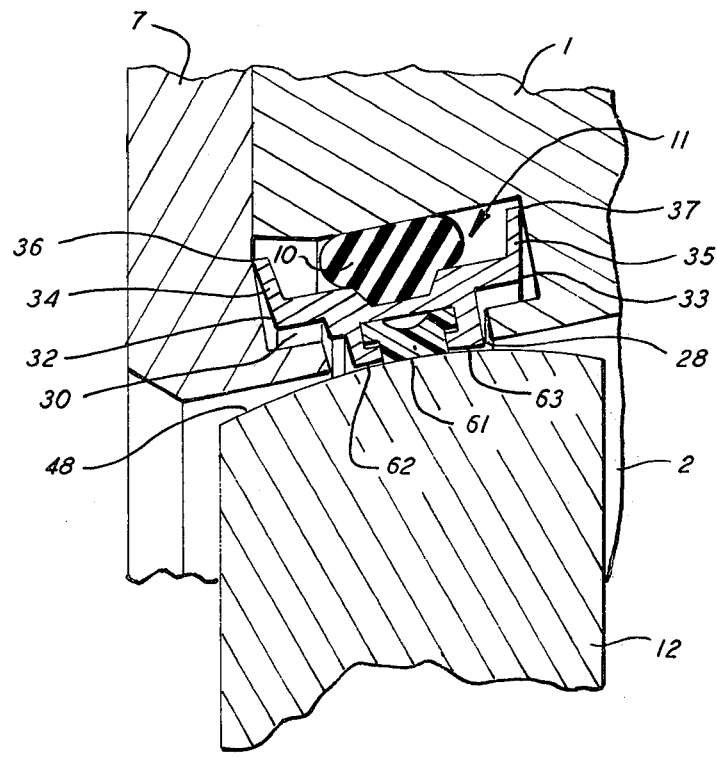
FIG. 7 is a partial cross section of the alternate preferred embodiment of FIG. 6a in combination with a conventional backing ring in the valve of FIG. 1, with the valve disc shut.

The completed T-shaped seat ring embodiment of FIG. 6A is shown installed in a valve in FIG. 7, comparable to the installation of the dovetail seat ring embodiment shown in FIG. 3. Just as in the arrangement of FIG. 3, the sealing surface 48 of valve disc 12 engages only primary seating surface 61 of seat ring 54. Secondary seating surfaces 62 and 63 of the hard metal seal ring 56 are held out of contact with the valve disc under normal operating conditions.

The embodiment of FIGS. 6 – 7 is particularly adapted to service with higher than usual operating pressures because the lips of undercut groove 55 provide superior protection against blowout of the seat ring when the valve is opened quickly, as compared with the dovetail groove and seat ring of the previously described embodiments. At the same time, the essentially right angle turns at the shoulders of the seat ring provide increased resistance to leakage between the seat ring and the seal ring at high pressures.

As with the other embodiments, rubber backing ring 10 performs a primary sealing function against leakage between the seal ring and the valve body, and outwardly biased seal ring skirt edges 36 and 37 provide a secondary seal against the respective side walls of groove 11 in the valve body.

Example

A wafer trunnion valve of the type illustrated, having a six-inch nominal inside diameter and rated for 150 pounds pressure was tested in accordance with the previously mentioned OCMA standards (published as OCMA Specification No. FSV-1: Fire Safe Test For Soft Seat Ball Valves). This Specification requires that the valve be subjected to a test pressure equal to its pressure rating, the test fluid being kerosene or diesel oil. The valve must next be exposed to fire, with the valve in the open position, for a period of time sufficient to assure that the soft seat and backup ring have completely decomposed or disintegrated. The valve must then be operated a minimum of three times within five minutes of extinguishing the fire. Then the valve shall be shut and tested at 15 psi and at full rated test pressure in that order. The leakage rate must not be in excess of 10 milliliters per minute per inch of valve diameter.

A six-inch valve equipped with a seal according to the present invention was subjected to this test. The measured leakage rates at 15 psi and at 300 psi rated test pressure after completion of the fire test was essentially zero. Upon subsequent disassembly of the valve it was determined that both the soft seat ring and the backup ring had completely disintegrated.

A subsequent test with an 18-inch valve yielded equivalent results.

In view of the previous experience of relatively high leakage rates encountered with mmetal seal rings, as decribed in the introductory portion of the Specification, the perfect performance of the "soft seat" metal seal rings of the present invention was completely unexpected. To the knowledge of the inventors, no other unmodified standard production butterfly trunnion valve has been able to meet the OCMA Specification. Certainly, no other resilient seated valve has so far exceeded the specification that no measurable leakage has been detected.

It is believed that the superior performance of the seal ring of the present invention results from the fact that the "soft" primary seating surface of the nonmetallic seat ring takes all the wear during the normal operating life of the valve. The metal seating surface of the shouldered ring is thus protected from wear and abrasion, thereby allowing it to provide a perfect seal in the emergency operating situation following a fire. The combined primary soft seat/backup hard seat of this improved seal ring thus provides far superior results to the all soft, all hard, or tandem soft and hard seat arrangements of the prior art.

As mentioned earlier, the material of the soft seat is preferably a nonmetallic plastic, such as polytetrafluoroethylene, for most applications. In some cases the soft seat may itself be metallic, but of a metal such as lead or copper which is much softer than the hardened metal of the seal ring.

We claim:

1. A seal ring for use as an extended-temperature range valve seat, the seal ring having a hard metal body formed with a cylindrical shoulder portion, the shoulder portion being defined by a circumferential front surface, an opposed circumferential rear surface, and two ends, a pair of circumferential flanges extending from the rear surface of the shoulder at each of the respective ends, each flange having a circumferential edge spaced radially from the rear surface of the shoulder portion, a circumferential rib extending from the front face of the shoulder portion intermediate the ends and terminating in a circumferential seating surface, the width of the rib being less than the distance between said ends of the shoulder portion, the seal ring being adapted to fit within an undercut circumferential groove in a seating region of a valve, such groove having substantially parallel sides spaced apart by a distance greater than the distance between the ends of the shoulder portion of the ring and an opening narrower than the distance between the sides of such groove, and the rib of the seal ring being adapted to extend through such a groove opening for movable mating engagement of the rib seating surface with a complementary sealing surface of such a valve, wherein the improvement comprises:

a circumferential groove being formed in the seating surface of said rib, the groove having an opening narrower than the width of an interior portion thereof and a seat ring of material softer than the metal of the seal ring, the seat ring fitting tightly within the groove in the rib and extending through the opening of the groove in the rib and beyond the rib seating surface to terminate in a primary valve seat surface, said primary valve seat surface of said seat ring being adapted to provide the only sealing engagement with such a complementary valve sealing surface unless the temperature inside such valve exceeds the destruction temperature of the seat ring material.

2. A seal ring according to claim 1 wherein the material of said seat ring comprises a resilient nonmetallic material.

3. A seal ring according to claim 1 wherein the material of the seal ring is stainless steel.

4. A seal ring according to claim 1 wherein the material of said seat ring is a metallic material.

5. A seal ring according to claim 1 wherein the groove in the rib of the seal ring has a dovetail cross section, and the seat ring has a complementary trapezoidal cross section.

6. A seal ring according to claim 1 wherein the groove in the rib of the seal ring has a dovetail cross section, and the seat ring has a complementary V-shaped cross section, whereby the seat ring is adapted to be inserted into the mouth of the dovetail groove by compressing the free edges of the V-section together.

7. A seal ring according to claim 1 wherein the groove in the rib of the seal ring has a T-shaped cross section, and the seat ring has a complementary T-shaped cross section.

* * * * *